Figure 1:
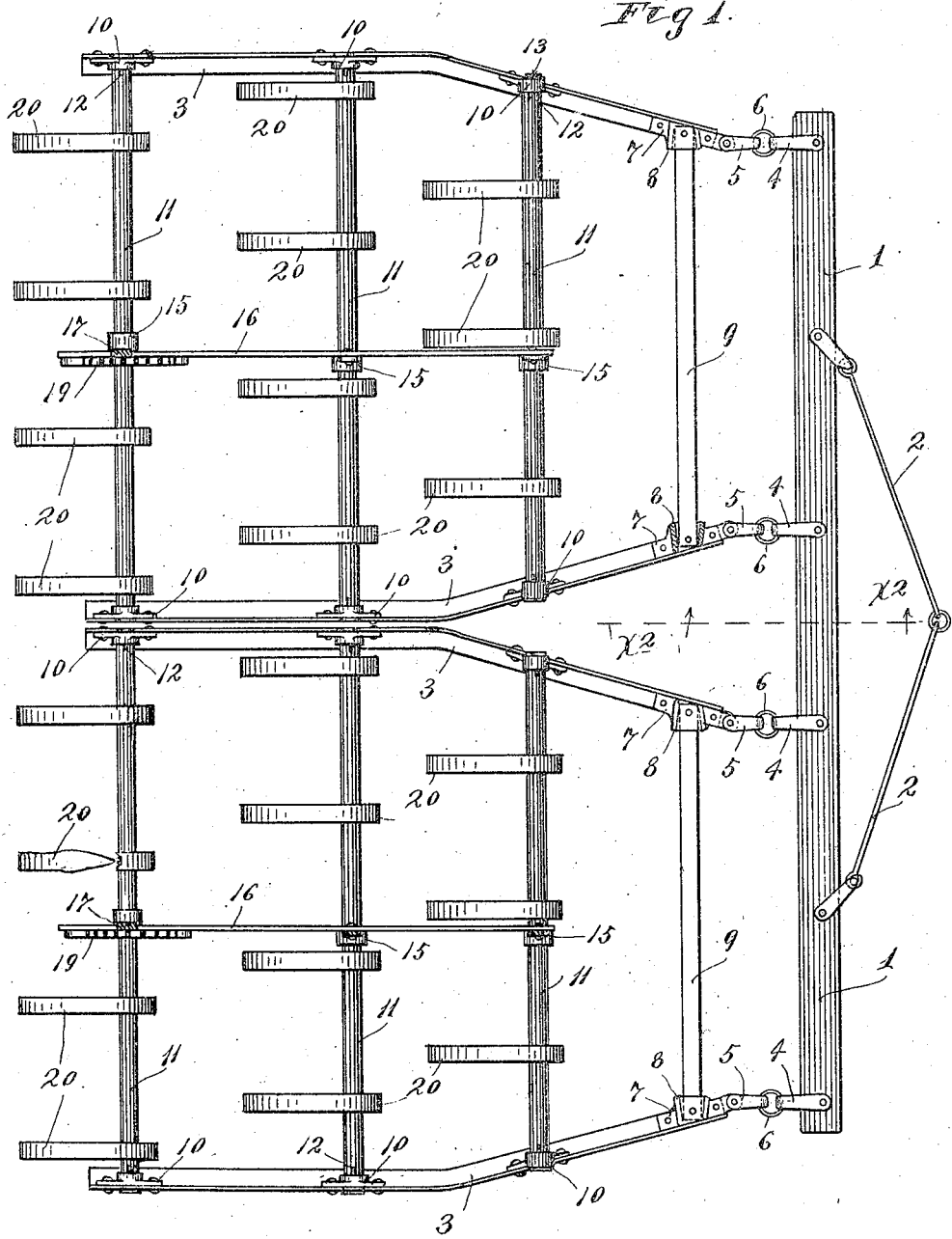

J. J. KOVAR.
SPRING TOOTHED HARROW.
APPLICATION FILED JAN. 23, 1914.

1,170,761.

Patented Feb. 8, 1916.
2 SHEETS—SHEET 1.

Witnesses.
A. H. Opsahl
E. C. Skinkle

Inventor
Joseph J. Kovar
By his Attorneys
Williamson & Merchant

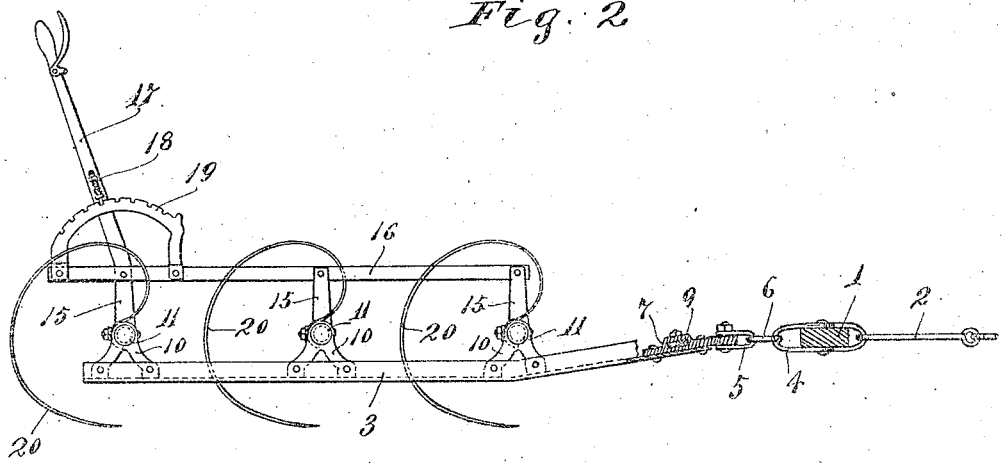
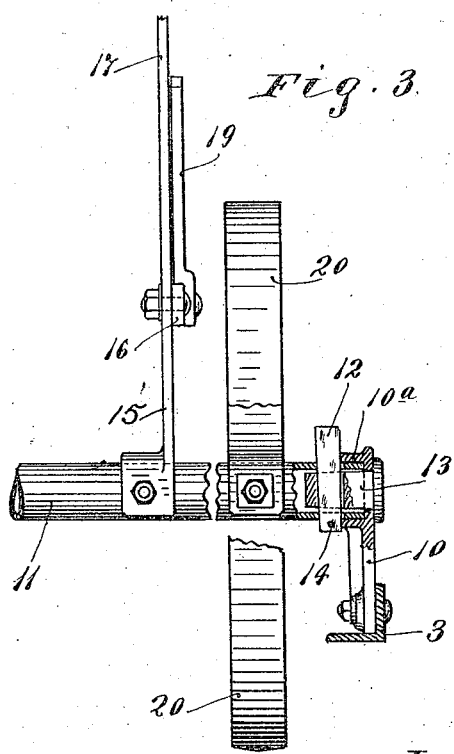

UNITED STATES PATENT OFFICE.

JOSEPH J. KOVAR, OF DODGE CENTER, MINNESOTA.

SPRING-TOOTHED HARROW.

1,170,761.   Specification of Letters Patent.   Patented Feb. 8, 1916.

Application filed January 23, 1914. Serial No. 813,872.

*To all whom it may concern:*

Be it known that I, JOSEPH J. KOVAR, a citizen of the United States, residing at Dodge Center, Claremont township, in the county of Dodge and State of Minnesota, have invented certain new and useful Improvements in Spring-Toothed Harrows; and I do hereby declare the following to be a full, clear, and exact description of the invention, such as will enable others skilled in the art to which it appertains to make and use the same.

My invention has for its object to provide an improved spring toothed harrow.

To such ends, generally stated, the invention consists of the novel devices and combinations of devices hereinafter described and defined in the claims.

In the accompanying drawings which illustrate the invention, like characters indicate like parts throughout the several views.

Referring to the drawings: Figure 1 is a plan view showing the improved harrow, some parts being sectioned; Fig. 2 shows the harrow chiefly in side elevation but with some parts sectioned on the line $x^2 x^2$ on Fig. 1; and Fig. 3 is a detail in rear elevation and with some parts broken away, showing a portion of the harrow.

The improved harrow is adapted to be made in any desired number of sections or units, but in the drawings, it is shown as made up of two sections or units connected to a common equalizing beam 1 having connections 2, to which a two, three or four horse evener may be attached. Each section or unit of this improved harrow comprises a pair of laterally spaced forwardly and rearwardly extended drag bars 3, the front ends of which are flexibly connected to the equalizer beam 1. These connections, as shown, are accomplished by clevises 4 and 5 and a connecting link 6. The clevises 4 are shown as pivotally connected to the beam 1, and the clevises 5 are pivotally connected to the forwardly projecting ends of coupling brackets 7. These coupling brackets 7 are riveted, or otherwise secured, to the front ends of the drag bars 3, and provided with inwardly diverging sockets 8. Tie bars 9 connect the front ends of the drag bars 3, their ends being inserted in and pivotally connected to the sockets 8 with loose joints, which permit the drag bars 3 to assume different angular positions in horizontal plane in respect to the equalizing beams 1.

The drag bars 3 are preferably made from angle steel or iron set with their lower flanges horizontally disposed for engagement with the ground and their other flanges upturned. Riveted or otherwise rigidly secured to the upturned flanges of the drag bars 3 are rock shaft bearings 10, the upper ends of which are formed with sockets $10^a$ (see particularly Fig. 3), that are arranged to receive and loosely fit the ends of tubular rock shafts or pipes 11. Said rock shafts 11 are adapted for horizontal angular movements within the sockets $10^a$, so that their drag bars 3 may change their angle slightly in respect to the several rock shafts, and they are, as shown, thus loosely connected by keys 12 inserted through slots in the ends of the said tubular shafts, and through slots in the inwardly projecting ends of headed trunnions 13, the heads of which bear against the outer faces of the upper ends of the said brackets 10. If desired, split keys or cotters 14 may be passed through the depending ends of the keys 12 to prevent their accidental displacement.

The several rock shafts 11 are provided with upwardly extended arms 15 that are connected by a link 16 pivoted to the upper ends thereof, so that the said rock shafts will be given common oscillatory movements. The rearmost arm 15 has a long upward extension in the form of an operating lever 17 provided with a latch 18 that coöperates with a notched latch segment 19, which latter is secured on the rear end portion of the link 16. The latch lever 17 is adapted to be locked to the segment 19 in different adjustments, so as to hold the rock shafts 11 in different positions.

The spring harrow teeth 20 are of curved and approximately involute form, formed from flat spring steel having sharp diamond pointed free ends for engagement with the ground and having their other ends bolted, or otherwise rigidly secured to the respective rock shafts 11. The spring teeth 20 of the several rock shafts are staggered in respect to each other, so that they will loosen up the entire surface of the ground over which the harrow is passed.

One feature in the present application is found in the form and arrangement of the spring harrow teeth, whereby they are adapted to be set with their flat diamond points directly below the rock shaft to which they are attached, and with the said points extending approximately horizontal at the place where they move through the ground. This provides an arrangement in which the points of the harrow teeth move through the ground with an endwise cutting action and gradually lift the earth under advance movement through the ground. In practice, I have found that this arrangement not only makes the harrow much easier to draw but insures better and more thorough working of the ground. In different kinds of work or for different conditions of the ground, the points of the harrow teeth may be set in different positions by proper manipulation of the lever 17.

The adjacent drag bars of the several sections or units of the harrow are arranged to work very closely together, so that the adjacent harrow teeth sections will come close together and not leaves an unworked or harrowed ridge ground between the harrow sections.

In the use of the harrow, under certain conditions, and especially when the harrow is turning a curve or is drawn on a curved line, the drag bars of the harrow sections, being flexibly tied together, may move in respect to each other and in respect to the rock shafts 11 and tie bar 9, and equalizing beam 1, so that they will more closely follow in the direct line of draft. Otherwise stated, when the harrow is drawn straight ahead and equal draft strain is applied on both harrow sections, the rear parallel portions of the drag bars 3 will be at a right angle to the connecting rock shafts 11, but when traveling a curve, the said drag bars will change their angle in respect to said rock shafts. The rock shafts it will be noted, also serve as ties between the drag bars.

As already indicated, the efficiency of this improved harrow has been demonstrated in practice.

What I claim is:

1. In a harrow, the combination with a common equalizing beam, of a harrow comprising laterally spaced drag-bars flexibly connected, at their front ends, to said equalizing beam, transverse rock shafts flexibly connected, at their ends, to said drag bars, harrow teeth applied to said rock shafts, and a front cross bar flexibly connected, at its ends, to the front ends of said drag bars.

2. In a harrow, the combination with a common equalizing beam, of a harrow made up of several units, each unit comprising laterally spaced drag bars flexibly connected, at their front ends, to said equalizing beam, rock shafts, flexible joints, loosely connecting said rock shafts, at their ends, to said drag bars for movement in a horizontal plane, harrow teeth applied to said rock shafts, means for oscillating the respective rock shafts to adjust the harrow teeth of each unit, and a front cross bar flexibly connected, at its ends, to the front ends of the respective drag bars.

3. A harrow comprising a pair of laterally spaced drag-bars having upwardly bent forwardly converging front ends, transverse rock-shafts, flexible joints, loosely connecting the rock-shafts at their ends to the drag-bars for movement in a horizontal plane, harrow-teeth applied to the rock-shafts, and a cross-bar connecting the forward ends of the drag-bars and limiting their lateral swinging movement.

In testimony whereof I affix my signature in presence of two witnesses.

JOSEPH J. KOVAR.

Witnesses:
JOHN KOVAR,
F. D. MERCHANT.